US 6,615,297 B1

(12) United States Patent
Beard et al.

(10) Patent No.: US 6,615,297 B1
(45) Date of Patent: Sep. 2, 2003

(54) SYSTEM AND METHOD FOR MANIPULATING DEVICE SETTINGS ACROSS DIFFERENT TYPES OF DEVICES

(75) Inventors: Eric Andrew Beard, Lexington, KY (US); Robert Jerome Borchers, II, Florence, KY (US); Evan Glenn Goldey, Lexington, KY (US); John Jeffrey Roberts, Georgetown, KY (US); Craig Anthony Rudolph, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/456,771

(22) Filed: Dec. 8, 1999

(51) Int. Cl.[7] ............................................... G06F 13/12
(52) U.S. Cl. .......................... 710/62; 710/64; 710/72; 382/276
(58) Field of Search ............................ 710/62, 64, 72; 382/276; 358/1.1, 1.15

(56) References Cited

U.S. PATENT DOCUMENTS

| 5,323,393 A | | 6/1994 | Barrett et al. | |
| 5,646,752 A | * | 7/1997 | Kohler et al. | ............... 358/520 |
| 5,694,618 A | | 12/1997 | Hibino | |
| 5,699,494 A | | 12/1997 | Colbert et al. | |
| 5,727,135 A | | 3/1998 | Webb et al. | |
| 5,905,906 A | | 5/1999 | Goffinet et al. | |
| 5,933,584 A | * | 8/1999 | Maniwa | ..................... 358/1.15 |
| 5,970,218 A | * | 10/1999 | Mullin et al. | .............. 358/1.15 |
| 6,075,615 A | * | 6/2000 | Nakamura | .................. 358/1.14 |
| 6,128,415 A | * | 10/2000 | Hultgren et al. | ............ 345/600 |
| 6,160,629 A | * | 12/2000 | Tang et al. | ................... 358/1.1 |

* cited by examiner

*Primary Examiner*—Jeffrey Gaffin
*Assistant Examiner*—Harold Kim
(74) *Attorney, Agent, or Firm*—John A. Brady

(57) ABSTRACT

A system and method for manipulating the private settings of a peripheral device where the system includes at least one host computer and a peripheral device in a communication interface. The peripheral device has a data store including setting data for public settings of a peripheral device and private settings of the peripheral device that are implicated in the public settings, and has a variable manager that is in communication with the data store of the peripheral device. The host computer transmits a data packet including one or more public settings for of the peripheral device across the communication interface and the variable manager receives the data packet and retrieves the setting data from the data store in response to receipt of the data to packet. The variable manager processes the data packet and manipulates one or more of the private settings of the peripheral device.

17 Claims, 5 Drawing Sheets

SYSTEM AND METHOD FOR MANIPULATING DEVICE SETTINGS ACROSS DIFFERENT TYPES OF DEVICES

BACKGROUND OF THE INVENTION

1. Field of the Invention

The present invention generally relates to computer systems. More particularly, the present invention relates to a system and method for manipulating the private settings of a computerized peripheral device without having knowledge of the specific private settings.

2. Description of the Related Art

Computers and common peripheral devices such as modems, printers, and displays are often connected in communication such that the computer, generally referred to as the host, can send data and receive data from the peripheral devices and other computers. The communication channel between the computer(s) and devices may be either unidirectional, such that one computer or peripheral device only sends or only receives data to another, or bidirectional, with each device both sending and receiving data.

A typical device-host connection is a cable connected directly to a serial or parallel port of both the host and the peripheral device such that the peripheral device primarily serves the connected host. Alternatively, a computer and peripheral device are connected in a network and each device is accessible to and can interface with multiple hosts residing on that network. In order to properly interface, the computer(s) and peripheral device(s) must have a known data protocol between them whereby each device can understand the data from one another.

The interface protocol is particularly important in host-peripheral device applications in which the host is controlling the peripheral device to perform a specific function. The data passed from the host computer to the peripheral device must be very specific in communicating the desired function for the peripheral device. In like manner, the peripheral device will often communicate with the host computer to inform the host computer of the current properties and functions of the peripheral device. An example of such interface is that between a host computer and a printer that typically communicate through a protocol known as the Network Printer Alliance Protocol (NPAP).

A printer has numerous private settings that convey specific configurations and functions specific to the printing function. A few examples of the configuration settings are component types, tolerances and memory. Prior art printers have the capability to send data back to a host computer indicative of the various current parameters of the printer to include the specific private settings for that device. Thus, when the computer and printer are interfaced, they are in bidirectional communication can pass the data regarding the specific private settings of the printer and commands. When the private settings of the printer are desired to be changed, the computer sends specific variables to the computer platform of the printer to change private settings of the printer where each variable affects one specific private setting of the printer. The printer, or other peripheral device, typically provides the private settings of peripheral device to the host computer with each setting represented by a specific variable. The host computer then can save the provided private settings and has the ability to restore the private settings to the peripheral device at a later time, if necessary. There are however several problems that are recurrent in the typical host computer-printer interface.

The private settings of each peripheral device are not consistent from device to device, so restoring settings from one device to another could cause the second device to crash. Further, the private settings of each individual peripheral device are not consistent through the various releases of the device. Another problem is that a host computer could set values for the peripheral device that were applicable to another peripheral device which would cause the current peripheral device to function improperly or crash.

This inconsistency of the private settings across devices has thus required that the host computer have advance knowledge of each device in order to perform special actions upon the peripheral device with variables certain to affect specific settings. The inconsistency also creates a problem in host computers that interact with multiple peripheral devices at the same time as the host computer cannot store the settings for each specific device with reasonable certainty that the stored settings can be restored to any other of the same type of peripheral device(s) in the interface.

Accordingly, the prior art is deficient in the capability to precisely affect the private settings of a peripheral device through different releases of the device. Furthermore, the private settings typically change through software updates, and if the settings of a peripheral device were not properly updated, the entire system would fail. The prior art systems consequently provide an unsatisfactory interface particularly between host computers and printers in that the capability to manipulate the private settings of the printer through several releases of the device and updates to the software is limited and prone to error. A system and method that allows the private settings of a peripheral device to be precisely manipulated by a host device, i.e. storage, updating, and retrieval of the private settings, would therefore represent an improvement over the prior art systems. It is to the provision of such an improved system and method that the present invention is primarily directed.

SUMMARY OF THE INVENTION

The present invention is a system and method for manipulating peripheral device settings across different types of peripheral devices, such as the private settings for a printer across different releases of the printer. The preferred system includes at least one host computer and a peripheral device in a communication interface with the host computer(s). The peripheral device has a data store, such as a local memory, including setting data that includes the public settings for the peripheral device and private settings of the peripheral device that are implicated in the public settings. The peripheral device also includes a variable manager in communication with the data store of said peripheral device.

Thus, in the system, the host computer transmits a data packet including one or more public settings for the peripheral device across the communication interface to the peripheral device. The variable manager of the peripheral device receives the data packet and retrieves the setting data from the data store in response to receipt of the data packet. The variable manager processes the data packet and manipulates one or more of the private settings of the peripheral device, such manipulation dependent upon the action either requested or implied in the data packet.

The communication interface between the host computer and the peripheral is preferably a NPAP interface, although other informational languages and protocols are alternately used. Thus, the data packet that includes one or more public settings for the peripheral device is preferably a NPAP packet. The preferred peripheral device is a printer having NVRAM memory as a data store and using the NPAP protocols, although other permanent and flash memories are alternately used in the peripheral device.

In one embodiment, the communication interface between the host computer and the printer occurs through a network, such as the Internet. Alternatively, the communication interface occurs through a direct connection between the host computer and the printer.

The system accordingly provides an inventive peripheral device in a communication interface with one or more host computers. The peripheral device has a data store including setting data for public settings of the peripheral device and private settings of the peripheral device that are implicated in the public settings. The peripheral device also includes a variable manager in communication with the data store, and the variable manager receives a data packet including a public setting across the communication interface. Upon receipt of the data packet, the variable manager retrieves the setting data from the data store and processes the data packet to interpret the information received therein. Then the variable manager either directly or indirectly manipulates one or more of the private settings of the peripheral device.

The present inventive system and peripheral device accordingly provide an inventive method of manipulating stored public settings and private settings in a peripheral device. The method includes the steps of receiving a data packet at the peripheral device to request an action relative to a public setting of the peripheral device, and processing the data packet at the peripheral device to determine the specific public setting(s) for which action is requested. The method then includes the steps of determining the private settings associated with the public setting data packet, and manipulating one or more public settings and/or one or more private settings of the peripheral device in response to the data packet.

The step of receiving a data packet is preferably the step of receiving a data packet including a request for the public setting at the peripheral device. And the step of manipulating one or more public settings and/or one or more private settings is preferably storing new private settings in response to the data packet.

The step of receiving a data packet is preferably the step of receiving a data packet including a request for the specific public setting of the computerized device. Consequently, the step of manipulating one or more public settings and/or one or more private settings is retrieving the public settings and/or private settings of the peripheral device in response to the data packet. When a specific public setting is requested for the peripheral device, the step of receiving a data packet is receiving a data packet including a request for the public setting at the peripheral device. Alternatively, the step of manipulating one or more public settings and/or one or more private settings is updating the private settings in response to the data packet upon receipt of a data packet requesting the altering of a public setting.

When the peripheral device is embodied with a variable manager, the step of processing the data packet at the peripheral device to determine the specific public setting for which action is requested is processing the data packet at a variable manger of the peripheral device. And the step of receiving a data packet at the peripheral device to request an action relative to a public setting of the peripheral device is receiving an NPAP data packet at the variable manager.

The present invention thus provides a commercial advantage in that through the addition of additional processing by the peripheral device variable manager of the public and private settings for the peripheral device when called to retrieve variables for the host computer, the device can insure that a common setting is returned or implemented. Additionally, the processing can remain unchanged when retrieving a variable for the device so that existing code in the device will continue to work without any changes. Similar processing of the public setting occurs in the variable manager when the host computer or peripheral device wants to update the private settings of the peripheral device. Because the variable manager validates each public or private setting before being updating a new private setting, the device cannot get into an unknown state from encountering an unrecognizable public or private setting.

The present invention consequently has industrial applicability as it can be implemented in any host computer-peripheral device interface, and is particularly suited for implementation on a printer in an interface with a host computer. Accordingly, different types and versions of the printer can be interchanged with the same host computer provided that the peripheral device can reference the public settings sent by the host computer.

Other objects, features, and advantages of the present invention will become apparent after review of the hereinafter set forth Brief Description of the Drawings, Detailed Description of the Invention, and the claims.

DETAILED DESCRIPTION OF THE INVENTION

Figure 1:
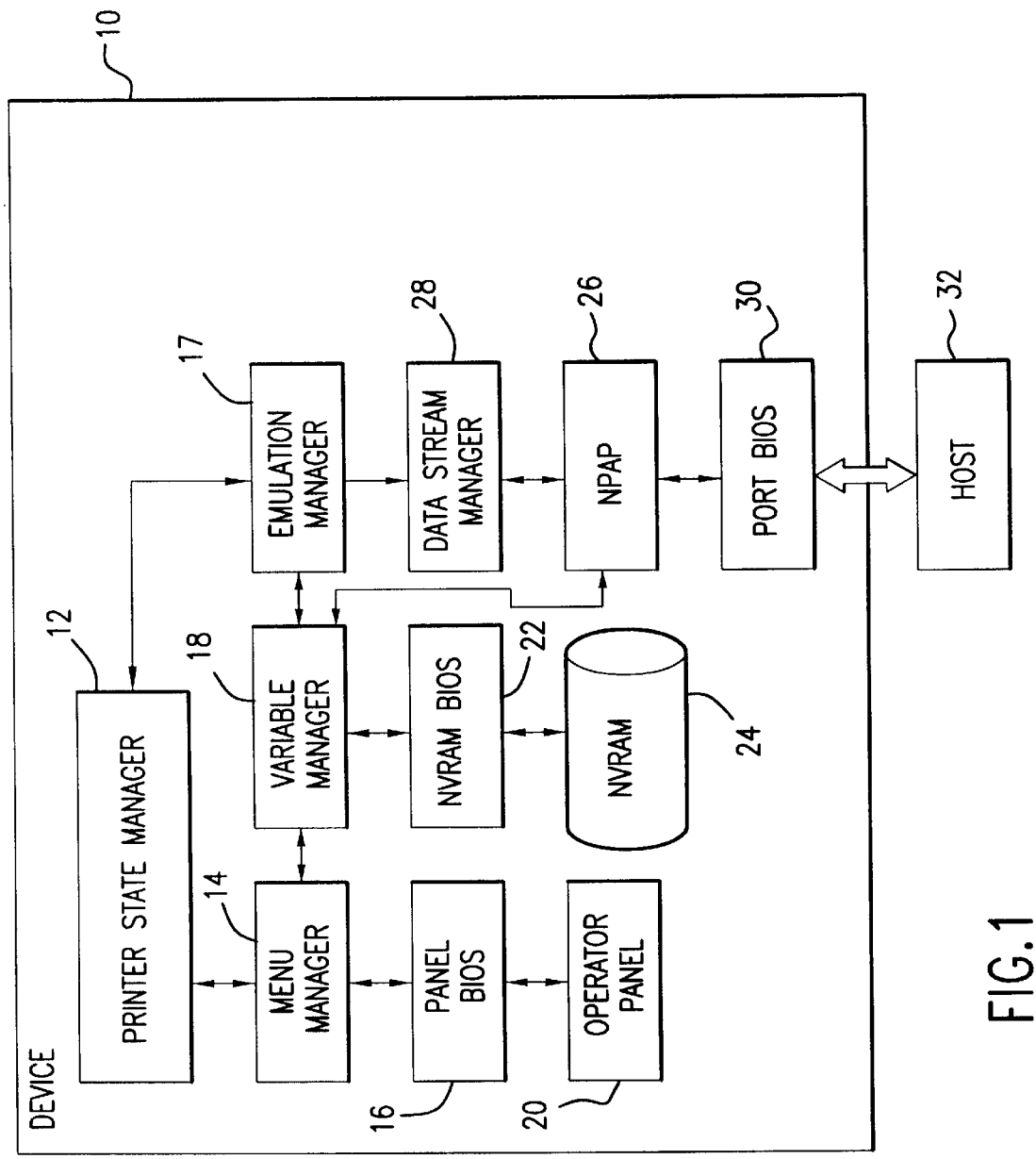
FIG. 1 is a block diagram of the various components within a printer.

Referring now to the drawings in which like numerals represent like components throughout the several drawings, FIG. 1 illustrates a block diagram for the interrelation of the various components within the device 10, which is illustrated here as a printer. The printer state manager 12 is in communication with the menu manager 14 and the emulation manager 16 to control the menu manager 14. The menu manager 14 receives data from the panel BIOS 16 for the printer, which receives and send data to the variable manager 18 for display to a user or host 32 and allows the user to input commands back to the menu manager 14. The menu manager 14 is in communication with a variable manager 18 that interprets variables for transmission, and those received from the host 32 through the NPAP interface 26, NPAP being the "Network Printer Alliance Protocol" which is a published protocol for host computer-printer communication. The variable manager 20 interacts through NVRAM BIOS 22 with the NVRAM 24 of the device 10 to have access to a menu of variables representing different parameters of the printer. The NVRAM 24 thus comprises a data store that can receive and store variable data for updating as well as provide the variable manger 20 with the referenced variables for the menu manager 14, and ultimately the printer state manager 12. Other non-volatile storage and permanent memories, either in RAM or ROM, and such as floppy discs, compact discs, and other rewriteable media, all of which are known in the art, can be alternately used as the data store of the peripheral device.

The variable manager is likewise in communication with the emulation manager 26 to transmit data through the data stream manager 28. The data stream manger 28 uses the NPAP interface 30 to communicate across the device interface which includes the port BIOS 32 and the network or direct connection to the host 34. The NPAP interface 30 is one embodiment of the communication protocol and other computer languages and protocols are alternately used between the devices in the interface system, such as extensible mark-up language (XML).

In creating a table for each variable that maps the private settings to public settings and having all host computer requests to retrieve a variable pass through the variable manager 18, the device 10 can ensure that common public settings are returned to the host, regardless of the specific private settings of the device 10. The table is alternately used to validate host computer requests to update a variable or public settings. Some examples of variables containing one or more public settings are toner darkness or internal margins. Examples of specific public settings are paper type in tray, paper size in tray, power conservation, and print quality. Finally, examples of private settings are the roll dimension for the print roll, the toner required for print quality, and components inactivated to conserve power. These settings would necessarily require the ability to be updated by a Customer Service Engineer once the device is in service.

The following is an example of the public setting and private setting variables and a table that makes the association between the two, with a sample reading and writing of the values.

An example of a program for the input of public values and private values in the resident memory, such as the NVRAM 24, of the peripheral device is:

```
/* Public values for substitute size-returned to or send by the host */
#define NPA_SUBSTSIZE_OFF 0
#define NPA_LETTER_A4 1
#define NPA_LEDGER_A3 2
#define NPA_SUSBST_ALL 99
/* Private values for substitute size-used inside the device */
enum
{
    NV_SUBSTSIZE_OFF,
#ifdef(LETTER_SUPPORT && A4_SUPPORT)
    NV_LETTER_A4,
#endif
    NV_LEDGER_A3,
    NV_SUBST_ALL
};
/* Table that maps between the values */
CONST NvEnums substizeVal[] =
{
    {NV_SUBSTIZE_OFF, NPA_SUBSTSIZE_OFF},
    {NV_LETTER_A4, NPA_LETTER_A4},
    {NV_LEDGER_A3, NPA_LEDGER_A3},
    {NV_SUBST_ALL, NPA_SUBST_ALL},
    {-1, -1}
};
```

An example of a read command of a value from a host computer is:
Where:
  A5 Start of Data Packet(SOP)
  aabb Length of Packet excluding SOP and these 2 bytes
  cc Flags as defined in any other NPAP writeup
  E0 Command: Lexmark Extension
  E7 Subcommand: Read/Write Variables
  00 Read Variable
  ddee id of Variable to read,
    an exemplary datastream that would be sent to a peripheral device to read the substitute size variable is "A5000640E0E7000181."

An example of a read command response from the peripheral device is:
Where:
  A5 Start of Data Packer(SOP)
  aabb Length of packet
  cc Flags as defined in any other NPAP writeup
  E0 Command: Lexmark Extension
  E7 Subcommand: Read/Write Variables
  00 Read Variable
  ddee id of Variable to read
  n value (dependent on variable requested),
    an exemplary datastream representative of a command response from a peripheral device is "A5000750E0E700018102."

Accordingly, an example of a write command of a value from a host computer is:
Where:
  A5 Start of Data Packet(SOP)
  aabb Length of Packet excluding SOP and these 2 bytes
  cc Flags as defined in any other NPAP writeup
  E0 Command: Lexmark Extension
  E7 Subcommand: Read/Write Variables
  01 Set Variable w/ Validation
  ddee id of Variable to write
  n value to write,
    an exemplary datastream from the host computer to the peripheral device is "A5000740E0E701018103."

An example of a response from the peripheral device to the host computer is:
Where:
  A5 Start of Data Packet(SOP)
  aabb Length of Packet excluding SOP and these 2 bytes
  cc Flags as defined in any other NPAP writeup
  E0 Command: Lexmark Extension
  E7 Subcommand: Read/Write Variables
  01 Set Variable w/ validation
  ddee id of variable to write
  ff return code 0—OK, 1—Success, 2—deferred
  n new value of the variable,
    an exemplary response of a datastream response from the peripheral device is "A5000840E0E70101810003".

Figure 2:
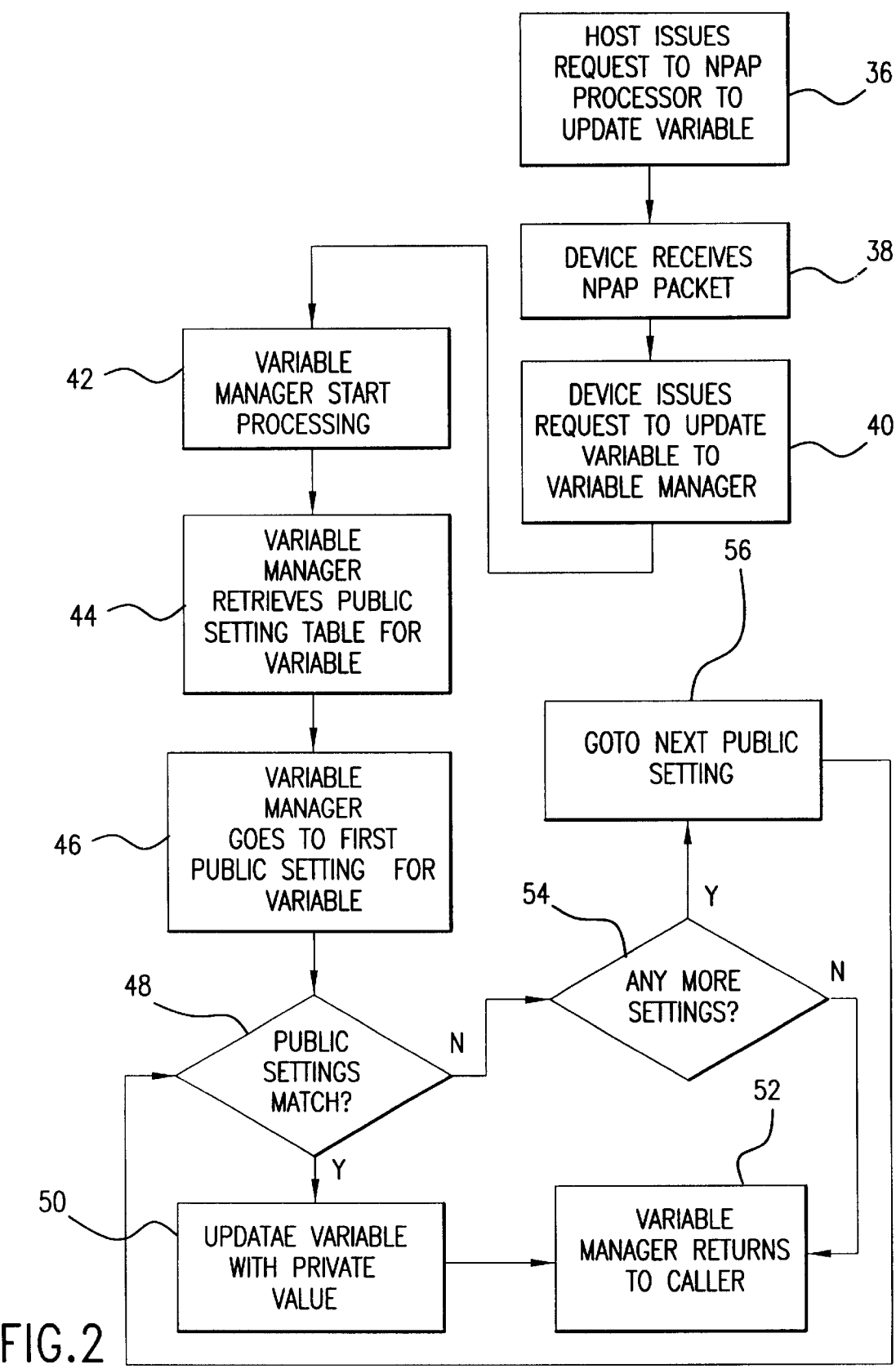
FIG. 2 is a flowchart illustrating updating a public setting variable in the peripheral device upon receipt of a NPAP data packet across a public communication interface.

FIG. 2 illustrates the preferred method for updating a variable representing a public setting with a request sent across an interface from a host computer to a peripheral device. The variable sent from the host computer can contain more than one public setting, and each public setting can imply more than one private setting for the peripheral device. The host computer issues a request to the NPAP processor resident on the host computer to update a specific variable at the peripheral device, shown at step 36. The peripheral device receives the data packet, at the NPAP interface 26, shown as step 38. Then the peripheral device issues an internal request to update the public variable at the variable manager 18, shown at step 40. The variable manger 18 begins to process the request, step 42, and then retrieves a public setting, preferably through a public setting table correlating the public settings with the private settings of the peripheral device, shown at step 44. Once the table is obtained, the variable manager 18 goes to the first public setting of the variable, shown at step 46. It is then determined if the first public setting matches any of the public settings in the public/private setting table, shown as decision 48.

If a match is found, then the private settings are updated in accord with the variable, shown at step 50, and then the variable manager 18 returns the process to the caller or user. If the public setting from the variable does not match, a determination is made as to whether there are any other further public settings present in the variable, shown at decision 54. If there are additional public settings present in the variable, then the process goes to the next public settings, shown at step 56 and a comparison is again made to determine if the public setting matches a known setting in the public/private setting table, or decision 48. If there are no further public settings present at decision 54, then the variable manager returns the process to the caller or user at step 52.

Figure 3:
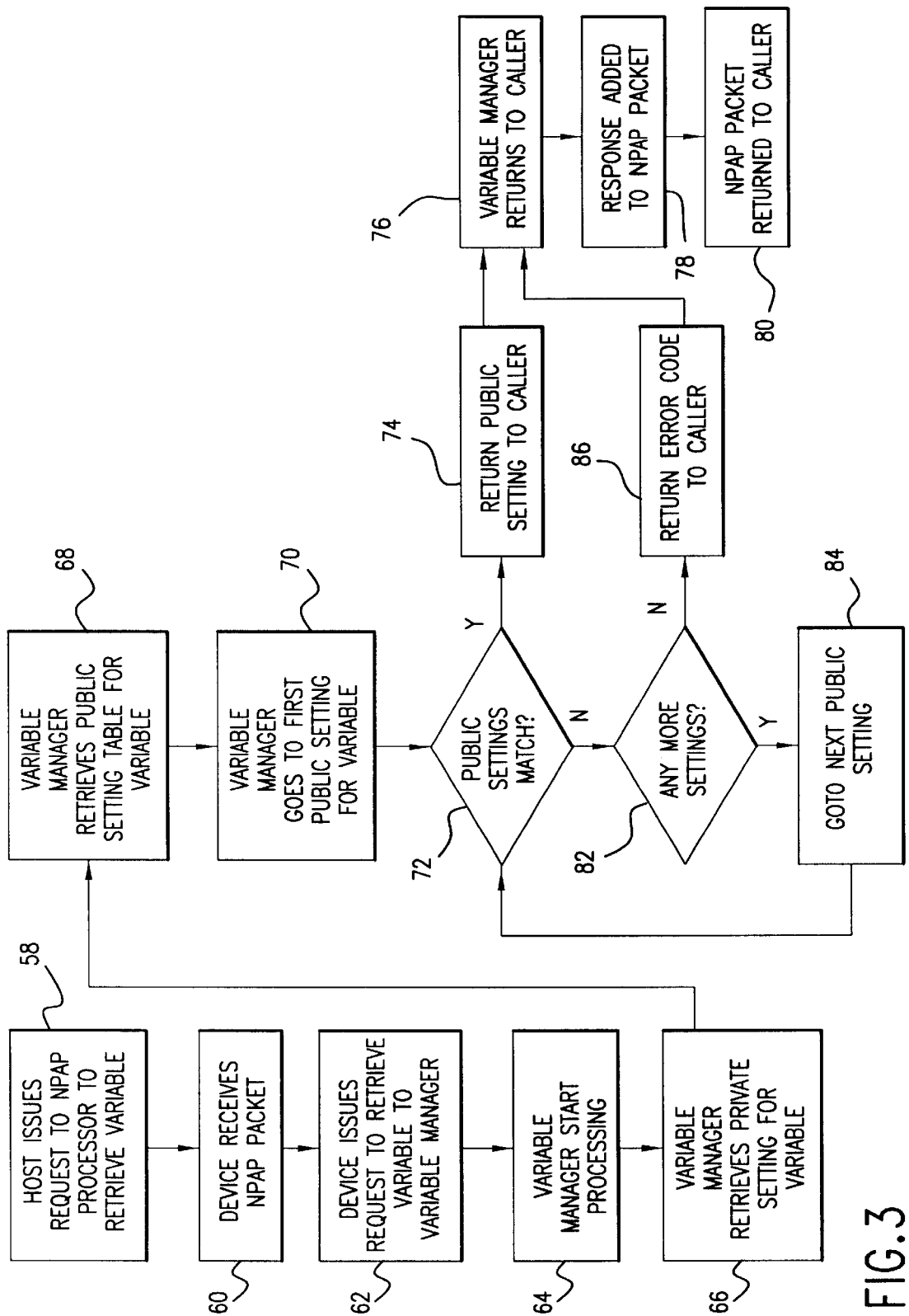
FIG. 3 is a flowchart illustrating retrieving a public setting variable in the peripheral device upon receipt of a NPAP data packet across a public communication interface.

With reference to FIG. 3, the preferred method of retrieving a variable including a public setting across an interface with a peripheral device. The host computer issues a request to its native NPAP processor to generate a request to retrieve a variable including a public setting from a peripheral device, shown at step 58. The peripheral device then receives the NPAP data packet from the host computer across the interface, shown at step 60, and the peripheral device issues a request to the variable manager 18 to retrieve the public setting, shown at step 62. The variable manager then begins to process the request, step 64, and retrieves the public setting from the request, shown at step 66, and then retrieves the public/private setting table from the resident memory, such as NVRAM 24, shown at step 68. The variable manager 18 then goes to the first public setting from the request, shown at step 70, and then a determination is made as to which private settings match the public setting request from the host computer, shown as decision 72.

Once a match is found between the public setting inquired of and the private settings of the machine, the process then returns the relevant public setting descriptive of the private settings of the peripheral device to the caller, shown as step 74, and the variable manger 18 then returns the relevant variable with the public setting, if required, to the caller, shown at step 76. The responsive variable and/or public settings is then encapsulated in an NPAP data packet, shown at step 78, and then the NPAP data packet is returned to the caller or user, shown at step 80.

If no private settings are located at decision 72, then a decision is made as to whether any further settings are present, shown at decision 82. If there are settings present, then the process goes to the next public setting, shown at step 84, and then the process again makes a determination as to whether the private settings match, shown as decision 72. If there are no further private settings at decision 82, then an error code is returned to the caller, shown at step 86, as a corresponding setting cannot be located in the peripheral device. Then the process returns to the variable manager to the caller, or step 76, and the error code is added to the NPAP packet, step 78, and the NPAP packet is returned to the caller, step 80.

Figure 4:
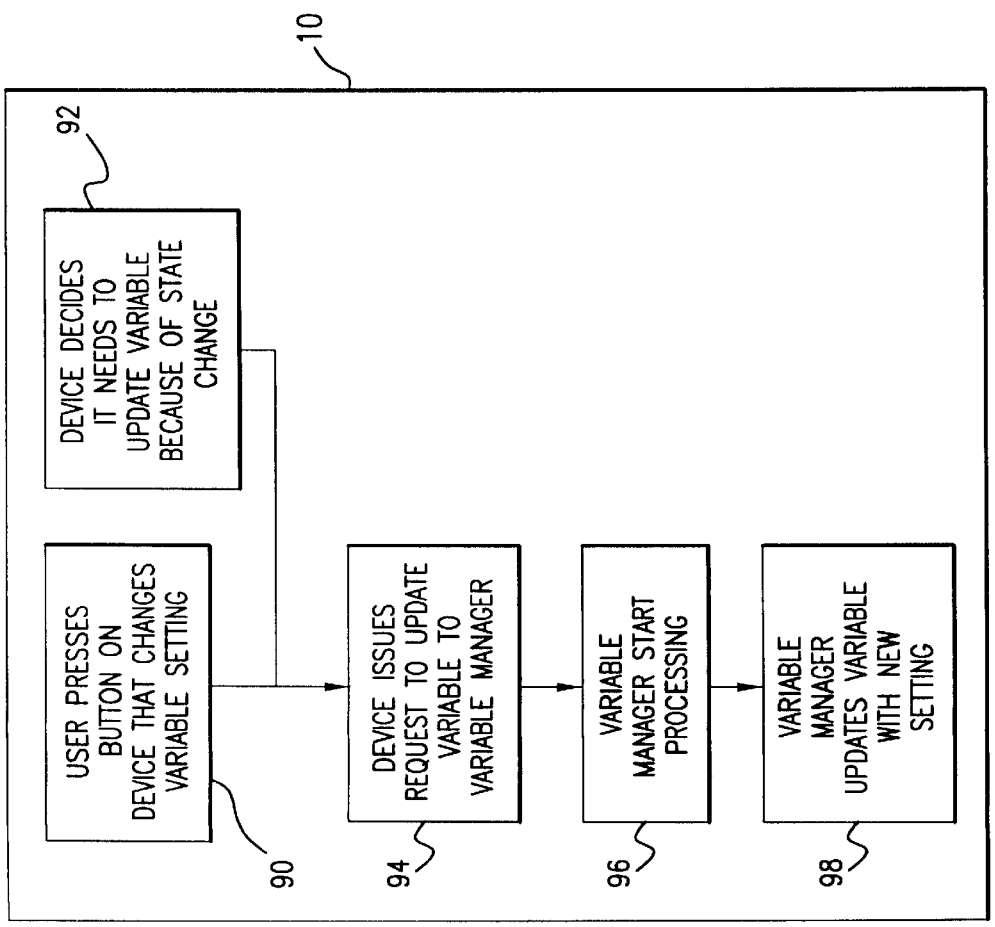
FIG. 4 is a flowchart illustrating storing a public setting variable in the peripheral device using a private interface on the peripheral device.

FIG. 4 illustrates the steps of updating a variable in the peripheral device 10 using a direct private setting interface. The user of the peripheral device can request, typically through pressing a button or entering a command, that a change be made in a variable setting on the peripheral device 10. Otherwise, the peripheral device 10 itself can issue a request for changing one or more private settings on the peripheral device 10 due to a change of state in the peripheral device 10, shown at step 92. The peripheral device 10 then issues a request to the variable manager 18, shown at step 94, and the variable manager 18, processes the request, shown at step 96, and retrieves the public/private setting table from resident memory. The variable manger 18 then updates the public setting in accord with the changes in the private settings of the peripheral device 10, or updates the private settings in response to a requested change in the public setting, shown at step 98.

Figure 5:
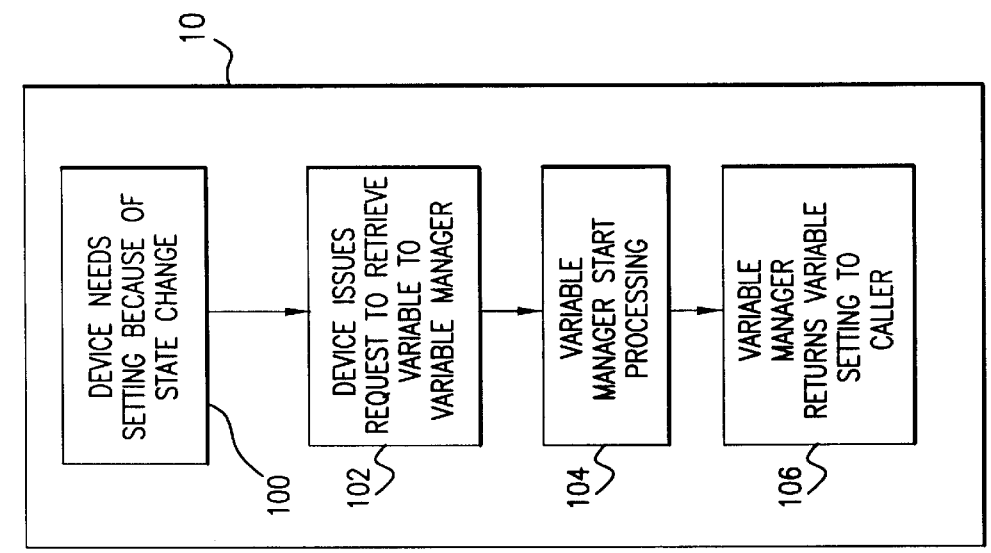
FIG. 5 is a flowchart illustrating retrieving a variable in the peripheral device using a private interface on the peripheral device.

FIG. 5 illustrates the method of retrieving a variable in the peripheral device using a private interface, similar to the method of FIG. 4. When the peripheral device 10 requires knowledge of the private settings because of a change of state of the device, shown at step 100, the device issues a request to the variable manager 18, shown at step 102, and the variable manager processes the request, shown at step 104. The variable manager 18 retrieves the public/private setting table and obtains the value for the requested public and/or private setting and returns the setting to the caller or user, shown at step 106.

Figure 6:
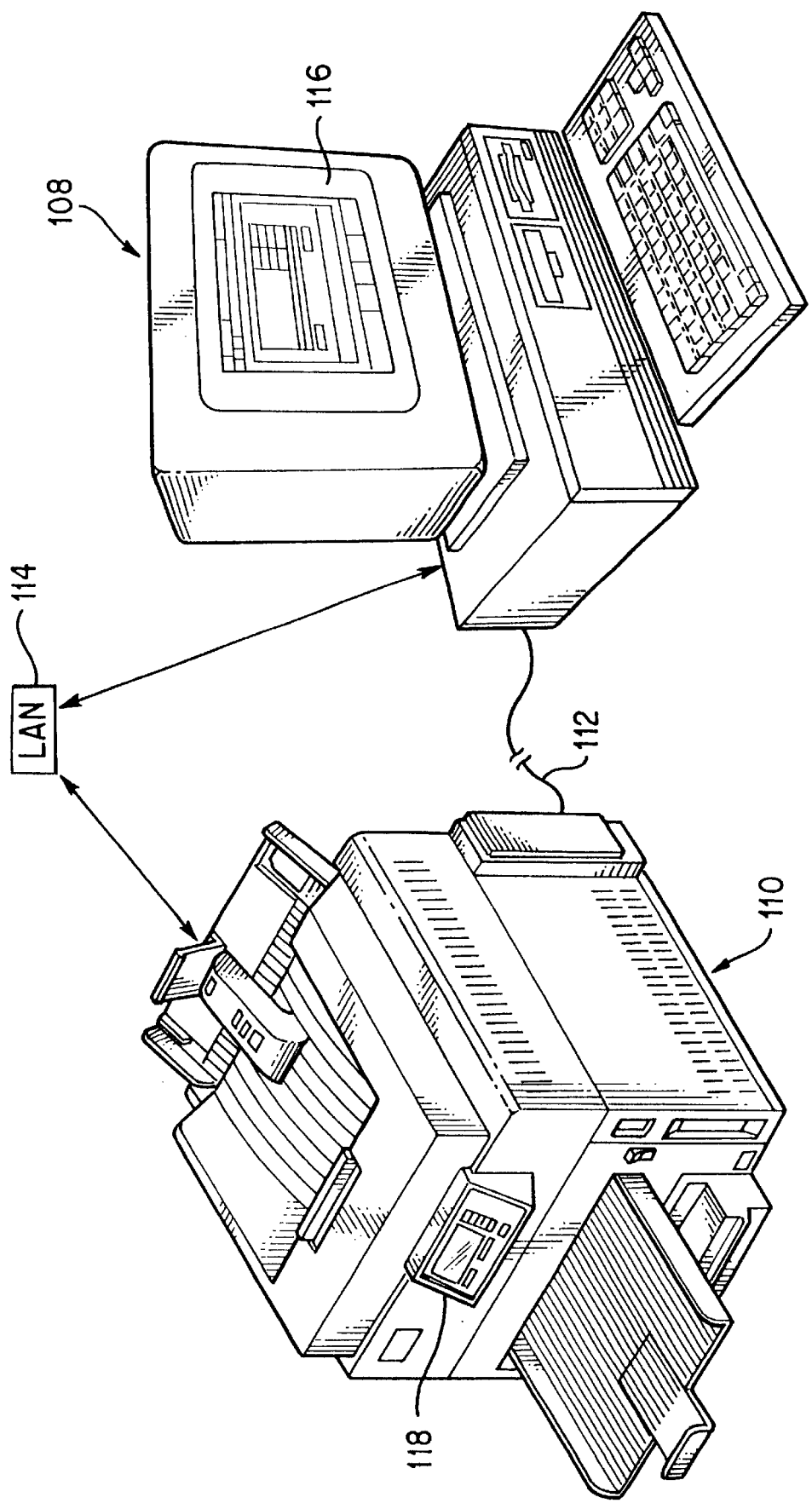
FIG. 6 is a perspective view of a host computer and a printer in an interface where the host computer updates the private settings of the printer through transmission of the public setting to the printer.

With reference to FIG. 6, a system is illustrated including a host computer 108 and a peripheral device printer 118 that are in an interface which implements the steps of the flowcharts of FIGS. 2 and 3. The printer 110 itself can implement the steps of the method of FIGS. 4 and 5, within its own private interface. The host computer 108 and 110 printer each have a processor and resident memory. The host computer 108 and printer 110 are shown in a communication interface with each other either through a direct port-to-port connection, as shown by cable 112, or such communication interface can occur through local area network (LAN), shown as connection 114, which can also be the Internet.

The host computer 108 generates either an update request for the private settings of the printer 102, with the method of FIG. 2, or can generate a retrieval request for the public setting of the printer 102. An operator panel on display 116 allows a user to press a virtual button or enter a command to update the public setting(s), the thus private settings, on the printer 110.

The command panel 118 on the printer 110 allows a user to manipulate the private settings of the printer directly through a private interface. The user can update the variables, as shown in FIG. 4, or retrieve for display at the control panel 118 the public settings, and alternately the private settings, of the printer 110. The command panel 118 preferably displays public settings similar to those that appear on the display 116 of the host computer 108 and the user can thus manipulate the public and private settings at the private interface.

The system as implemented on the host computer 108 and printer 110 accordingly provides an inventive method of manipulating stored public settings and private settings in a peripheral device. The method includes the steps of receiving a data packet, such as a NPAP packet, at the peripheral device, such as printer 110, to request an action relative to one or more public settings of the peripheral device, and processing the data packet at the peripheral device to determine the specific public setting(s) for which action is requested. The method then includes the steps of determining the private settings of the peripheral device associated with the public setting in the data packet, and manipulating one or more public settings and/or one or more private settings of the peripheral device in response to the data packet.

If the purpose of the data packet is to store new public settings on the peripheral device, then the step of receiving a data packet is receiving a data packet including a request to store the new public setting of the peripheral device, and the step of manipulating one or more public settings and/or one or more private settings is storing the new public setting in response to the data packet. The storage of each new public setting will accordingly alter the related private settings on the peripheral device.

If the purpose of the data packet is to have the peripheral device return one or more public setting of the peripheral device to the host computer, then the step of receiving a data packet is receiving a data packet including a request for the public settings and/or private settings of the peripheral device, and the step of manipulating one or more public settings and/or one or more private settings is retrieving one or more public settings of the peripheral device in response to the data packet. The public setting thus gives the host computer a current configuration of peripheral device, such as paper load status of a printer.

If the purpose of the data packet is to have the public/private settings of the peripheral device updated, then the step of receiving a data packet is receiving a data packet including a request to update one or more public settings of the peripheral device, and the step of manipulating one or more public settings and/or one or more private settings is updating private settings in response to the data packet. The updating of each new public setting will accordingly alter the related private settings on the peripheral device.

The method preferably occurs upon host computer 108 and printer 110 as embodied above. Consequently, the step of processing the data packet at the peripheral device to determine each specific public setting for which action is requested is preferably processing the data packet at the variable manger 18 (FIG. 1) of the peripheral device. And as discussed above, the step of receiving a data packet at the peripheral device to request an action relative to a public setting of the peripheral device is preferably receiving a NPAP data packet.

While there has been shown the preferred and alternate embodiments of the present invention, it is to be understood that certain changes can be made in the forms and the arrangement of the elements and in the steps of the inventive method without departing from the spirit and scope of the invention as set forth in the Claims appended herewith.

What is claimed is:

1. A system for manipulating the private settings of a peripheral device, said system comprising:
   at least one host computer;
   a peripheral device in a communication interface with the at least one host computer, the peripheral device having a data store including a map of setting data comprised of public settings for the peripheral device and private settings of the peripheral device that are implicated in the public settings, the peripheral device including a variable manager in communication with the data store of the peripheral device; and
   wherein the host computer transmits a data packet including one or more public settings for the peripheral device across the communication interface and the variable manager receiving the data packet, the variable manager retrieving the setting data from the data store in response to receipt of the data packet, and the variable manager processing the data packet and manipulating one or more of the private settings of the peripheral device in accordance with said map.

2. The system of claim 1, wherein the communication interface is a NPAP interface.

3. The system of claim 1, wherein the communication interface is a XML interface.

4. The system of claim 1, wherein the data store of the peripheral device is non-volatile storage.

5. The system of claim 4, wherein the non-volatile storage is NVRAM memory.

6. The system of claim 1, wherein the data packet including one or more public settings for the peripheral device is a NPAP packet.

7. The system of claim 1, wherein the peripheral device is a printer.

8. The system of claim 1, wherein the communication interface occurs through a network.

9. The system of claim 8, wherein the network is the Internet.

10. The system of claim 1, wherein the communication interface occurs through a direct connection between the host computer and the peripheral device.

11. A peripheral device in a communication interface with one or more host computers, said peripheral device comprising:
    a data store including a map of setting data comprised of public settings for the peripheral device and private settings of the peripheral device that are implicated in the public settings; and
    a variable manager in communication with the data store, the variable manager receiving a data packet including a public setting across the communication interface, and the variable manager retrieving the setting data from the data store in response to receipt of the data packet, and the variable manager processing the data packet and manipulating one or more of the private settings of the peripheral device in accordance with said map.

12. The peripheral device of claim 11, wherein the communication interface is a NPAP interface.

13. The peripheral device of claim 11, wherein the communication interface is a XML interface.

14. The peripheral device of claim 11, wherein the data store of the peripheral device is non-volatile storage.

15. The peripheral device of claim 14, wherein the non-volatile storage is NVRAM memory.

16. The peripheral device of claim 11, wherein the data packet includes at least one public setting is a NPAP packet.

17. The peripheral device of claim 16, wherein the peripheral device is a printer.

* * * * *